United States Patent
Park (10) Patent No.: US 10,069,796 B2
(45) Date of Patent: Sep. 4, 2018

(54) APPARATUS AND METHOD FOR PROVIDING CONTROLLING SERVICE FOR IOT SECURITY

(71) Applicant: WINS Co., Ltd., Seongnam-Si, Gyeonggi-do (KR)

(72) Inventor: Cheol Jeong Park, Gyeonggi-do (KR)

(73) Assignee: Wins Co., Ltd., Seongnam-Si (KR)

( * ) Notice: Subject to any disclaimer, the term of this patent is extended or adjusted under 35 U.S.C. 154(b) by 224 days.

(21) Appl. No.: 15/157,405

(22) Filed: May 18, 2016

(65) Prior Publication Data

US 2016/0352685 A1  Dec. 1, 2016

(30) Foreign Application Priority Data

May 27, 2015  (KR) .......................... 10-2015-0074060

(51) Int. Cl.
*H04L 29/06* (2006.01)
*H04W 4/70* (2018.01)

(52) U.S. Cl.
CPC ...... *H04L 63/0245* (2013.01); *H04L 63/1416* (2013.01); *H04L 63/1425* (2013.01);
(Continued)

(58) Field of Classification Search
CPC ............. H04L 63/0245; H04L 63/1416; H04L 63/1425; H04L 63/1458; H04W 4/70
(Continued)

(56) References Cited

U.S. PATENT DOCUMENTS

2002/0143955 A1* 10/2002 Shimada ................. H04L 29/06
709/227
2015/0249672 A1* 9/2015 Burns ..................... H04L 12/66
726/4
(Continued)

FOREIGN PATENT DOCUMENTS

| KR | 10-2009-0009416 A | 1/2009 |
| KR | 101410274 B1 | 6/2014 |
| KR | 10-2014-0117107 A | 10/2014 |

OTHER PUBLICATIONS

Korean Patent Abstract (in English) of KR Pub. No. 1020140117107 A, Pub dated Oct. 7, 2014, downloaded Nov. 8, 2016 from http:/engpat.kipris.or.kr.
(Continued)

*Primary Examiner* — Michael S McNally
(74) *Attorney, Agent, or Firm* — Barcelo, Harrison & Walker, LLP (57) ABSTRACT

The present invention provides a technology for controlling an IoT gateway command control based packet, preemptively blocking information leakage by detecting/blocking command not allowed through a DB updated by automatically learning new commands recognized based thereon in real-time, determining whether they correspond to each other through search/comparison in each pattern DB corresponding thereto and selectively processing the corresponding packet according to the determined result, generating a session table based on the processed result and determining whether there is an abnormal act by checking a predetermined item, and blocking access to IoT server of abnormal packet by performing a policy according to packet blocking rule management flow.

14 Claims, 7 Drawing Sheets

(52) U.S. Cl.
CPC .......... *H04L 63/1458* (2013.01); *H04L 63/20* (2013.01); *H04W 4/70* (2018.02)

(58) Field of Classification Search
USPC .......................................................... 726/13
See application file for complete search history.

(56) References Cited

U.S. PATENT DOCUMENTS

| | | | |
|---|---|---|---|
| 2016/0112434 A1* | 4/2016 | Chung ................ | H04L 63/0807 726/4 |
| 2016/0173495 A1* | 6/2016 | Joo ........................ | H04L 63/08 713/171 |

OTHER PUBLICATIONS

Korean Patent Abstract (in English) of KR Pub. No. 1020090009416 A, Pub dated Jan. 23, 2009, downloaded Nov. 8, 2016 from http:/engpat.kipris.or.kr.

Korean Patent Abstract (in English) of KR Pub. No. 101410274 B1, Pub dated Jun. 20, 2014, downloaded Nov. 8, 2016 from http:/engpat.kipris.or.kr.

Kasinathan, P. et al.; "Denial-of-Service detection in 6LoWPAN based Internet of Things"; 2013 IEEE 9th International Conference on Wireless and Mobile Computing, Networking and Communications (WiMob); pp. 600-607.

Office Action dated Mar. 2, 2016, Issued by Korean Intellectual Property Office, in App. 9-5-2016-016584861 (in Korean).

\* cited by examiner

| No. | access area | device type | device number | command number | registration time | count | D-IP/D-Port | data |
|---|---|---|---|---|---|---|---|---|
| | | | | | | | | |
| | | | | | | | | |

APPARATUS AND METHOD FOR PROVIDING CONTROLLING SERVICE FOR IOT SECURITY

CROSS-REFERENCE TO RELATED APPLICATIONS

This application claims priority from Korean Patent Application No. 10-2015-0074060, filed on May 27, 2015, in the Korean Intellectual Property Office. The entire contents of said application are incorporated herein by reference.

BACKGROUND OF THE DISCLOSURE

1. Technical Field

The present invention relates to providing a network security policy. Particularly, the present invention is for Internet of Things (hereinafter, "IoT") security.

2. Background Art

Network has expanded from the concept of ubiquitous installed in a closed network or a private network to collect and control information on things, to the concept of Internet of Things (IoT) where information on things is collected and controlled from an open internet environment.

In order to lower manufacturing cost, most IoT sensors are mounted only with basic functions, and have their inner security function minimized. Thus, the product in itself has weak points, and thus may be hacked easily. Also, IoT sensors are installed in an open environment, allowing dispossession/disassembling, and thus they may be easily infected or controlled by hackers. As a result, hackers can make to collapse IOT sensor network by causing abnormal mass traffic with infected the IoT sensor. And also hackers may provide a method for giving out information including classified information or private information, etc. stored in an inner IoT collecting server by reversely accessing IoT sensor network with the infected sensor which hacker could control totally. In order to strengthen security for low cost IoT sensors and terminals installed in an open environment, they are mounted with a software based secure OS or an integrity check function, or the functions are minimized by mobile device management (MDM) and mobile vaccine. However, as hacking techniques develop and due to the zero day weak points of the product itself, there is still no method for detecting infection of an IoT terminal/server with software installed within the sensor, nor a method for detecting commands reversely accessed by the hacker and abnormal commands transmitted to the internal network.

SUMMARY OF THE INVENTION

Thus, the present invention aims to provide a technology for detecting and controlling malicious act of a packet trafficked between an IoT sensor and an IoT information collecting server in a network based on Internet of Things (hereinafter, "IoT").

According to an aspect of the present invention, the present invention includes reading a packet trafficked from a plurality of IoT devices dispersed in a network supporting IoT service to collect data corresponding to the IoT service; selectively processing the corresponding packet according to the pattern DB based search result corresponding to each predetermined item of the read packet through a predetermined policy, and generating a session table based on the processed result; determining whether there is an abnormal act by checking a predetermined item of the session table, and blocking access to IoT server of abnormal packet by performing a policy according to a packet blocking rule management flow; determining whether a command corresponding to the packet is harmful based on the command pattern DB based search result defining the command allowed for each IoT device integrally managed at the network; and storing the packet blocked through the predetermined policy per predetermined unit, extracting a new object based on information on the packet regulated by a predetermined interval in the stored packet, and registering it in the corresponding pattern DB.

According to another aspect of the present invention, the present invention includes a packet collecting part for reading a packet trafficked from a plurality of IoT devices dispersed in a network supporting IoT service to collect data corresponding to the IoT service under the control of a controlling unit, selectively processing the corresponding packet according to the pattern DB based search result corresponding to each predetermined item of the read packet through a predetermined policy, and generating a session table based on the processed result; a preemptive blocking part for determining whether there is an abnormal act by checking a predetermined item of the session table generated by the packet collecting part, and blocking access to IoT server of abnormal packet by performing a policy according to packet blocking rule management flow; a command controlling part for determining whether a command corresponding to the packet is harmful based on the command pattern DB based search result defining the command allowed for each IoT device integrally managed at the network; and a command learning part for storing the packet blocked through the predetermined policy per predetermined unit, extracting a new object based on information on the packet regulated by a predetermined interval in the stored packet, and registering it in the corresponding pattern DB.

The present invention has an effect of fundamentally blocking information leakage by detecting/blocking commands not allowed intending to give out necessary information by accessing IoT information collecting server in real-time with control right secured through dispossession/dissembling of IoT sensor installed in an open environment.

Also, the present invention has an effect of minimizing the spread by blocking attempts to infect or control other IoT sensors/terminals through an IoT network.

Also, the present invention has an effect of minimizing the load of the IoT network and collecting server by recognizing and controlling aggressive packets occurring due to infection and abnormal operation of IoT.

DETAILED DESCRIPTION

Best Mode for Carrying Out the Invention

Hereinafter, preferred embodiments according to the present invention will be explained in detail with reference to the attached drawings. While specific details such as components are described in the following description, they are given to help comprehensive understanding of the present invention. Therefore, it is clearly to be understood to those skilled in the art that changes or modifications can be made to the present invention within the scope and spirit of the present invention.

The present invention is for detecting and controlling malicious act of a packet trafficked between an IoT sensor and an IoT information collecting server in a network based on Internet of Things (hereinafter, "IoT"). More specifically, the present invention controls an IoT gateway command control based packet, preemptively blocks information leakage by detecting/blocking commands not allowed through a DB updated by automatically learning new commands recognized based thereon, recognizes the IoT device type and commands predetermined for each IoT device type through packet information of the packet read to minimize the load of IoT information collecting server, determines whether they correspond to each other through search/comparison in each pattern DB corresponding thereto and selectively processes the corresponding packet according to the determined result, generates a session table based on the processed result and determines whether there is an abnormal act by checking a predetermined item, and blocks access to IoT server of abnormal packet by performing a policy according to packet blocking rule management flow.

Also, the present invention aims to provide a technology for limiting malicious act in advance by determining whether a command corresponding to the packet is harmful based on the command pattern DB based search result defining the command allowed for each IoT device, extracting a new object based on information on the packet regulated by a predetermined interval in the packet blocked as a result of the process, and registering it in the corresponding pattern DB, for protecting the IoT device within the IoT service network more safely by avoiding indiscriminate blocking of malicious act and gradually understanding other attacks from a predetermined attack based on the command generating period, and for minimizing loss of IoT service activation caused by blocking malicious act by distinctively applying commands for actual control of IoT devices to clearly distinguish attacks from malfunctioning of the device when determining a malicious act.

Also, an IoT device according to an embodiment of the present invention is a sensor arbitrarily dispersed in a network supporting IoT service for monitoring and collecting data corresponding to the IoT service. For example, it may be interpreted as a concept referring to a state detecting device for a specific use capable of sensing data corresponding to the operation of a thermometer, air conditioner, heater in a predetermined period and providing sensing result through the network.

Hereinafter, a method for providing a controlling service for IoT security according to an embodiment of the present invention will be explained in more detail with reference to FIG. 1 and FIG. 2.

First, before explaining the technology for providing a controlling service for IoT security of the present invention in detail, the constitution of the network performing IoT service to which the present invention is applied is briefly explained with reference to FIG. 1.

Figure 1:
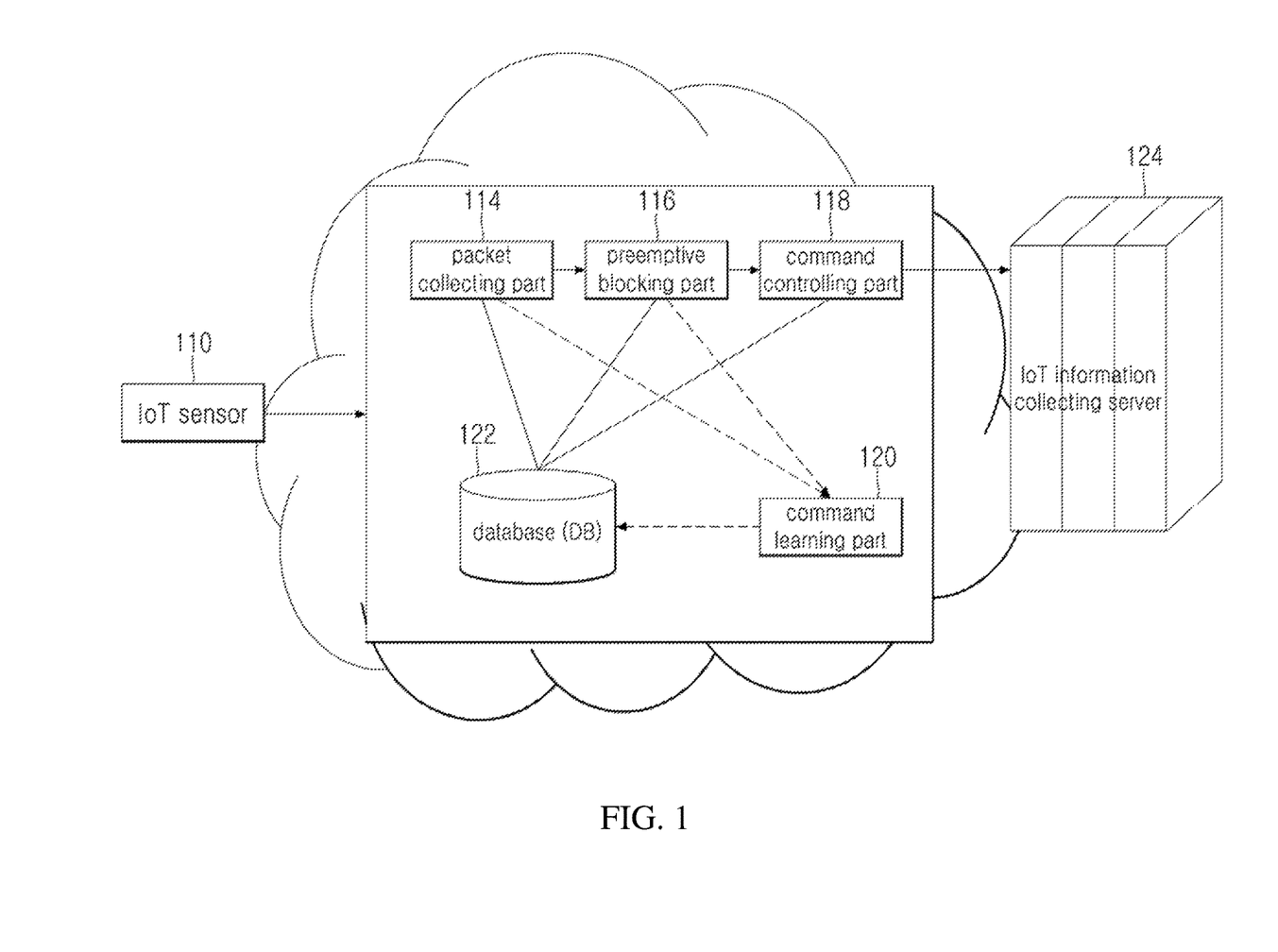
FIG. 1 is a block diagram schematically illustrating an IoT service network to which a method for providing a controlling service for IoT security according to an embodiment of the present invention is applied.

FIG. 1 schematically illustrates an IoT service network to which a method for providing a controlling service for IoT security according to an embodiment of the present invention is applied. Referring to FIG. 1, the IoT service network according to the present invention includes a plurality of IoT devices 110 . . . n, an apparatus 112 for providing a controlling service for IoT security based on command control IoT gateway, and an IoT information collecting server 124.

The IoT device 110 is arbitrarily dispersed in a network supporting IoT service for collecting data corresponding to the IoT service. The IoT device 110 includes various sensors such as an operation sensor, temperature sensor, cooling/heating sensing sensor, door or window surveillance (opening/closing) sensor, etc. The sensor is dispersed in a network supporting IoT service for monitoring its state and surrounding environment in the corresponding network in real-time, and this is reported through the network.

Here, the IoT service refers to the concept of a network connecting things and space, which forms an intellectual relation such as sensing, networking, information processing, etc. in cooperation with each other without explicit intervention of a human regarding environmental elements where the three constituents, human, things, and service are dispersed. Thing, the main constituent of IoT includes not only communication equipment in wired/wireless network, but also human, vehicles, bridges, various electronic devices, cultural assets, physical objects, etc. configuring the environment. IoT interacts not only with things, but also with all information in real life and the virtual world by expanding the concept of M2M allowing intellectual communication between human beings and objects and between objects and objects, using the network, to the Internet.

The network communication service technology applied to the present invention is an IoT service interface technology, which allows the main constituents (human, thing, service) of IoT to perform the role of interworking with applied services performing specific functions.

The apparatus 112 for providing a controlling service for IoT security performs operation based on the command control IoT gateway control policy, and includes a packet collecting part 114, a preemptive blocking part 116, a command controlling part 118, a command learning part 120, and a DB 122. When exchanging data between the plurality of IoT devices 110 . . . n and the IoT information collecting server 124, the predetermined control policy is selectively applied and processed by reading a packet trafficked from a plurality of IoT devices 110 . . . n and recognizing abnormal packet included in the payload and packet including commands not allowed.

The apparatus 112 for providing a controlling service for IoT security to which the present invention is applied aims at the efficiency of DB management by automatically learning new commands added and updating the command pattern DB, and strengthens security in exchanging information based on IoT network service by blocking DoS packets and harmful packets generated in IoT device based on the policy.

Next, the IoT information collecting server 124 integrally manages data generated in the corresponding network 100 in association with a plurality of IoT devices 110 through an apparatus 112 for providing a controlling service for IoT security, and performs security related control. It interworks with IoT devices located in predetermined areas supported with the service of the network 100, manages security related events generated in each area, and manages the IoT device type and the DB corresponding to the command pattern for each IoT device type based on data transmitted from the apparatus 112 for providing a controlling service for IoT security.

Meanwhile, a plurality of IoT devices in the IoT service network may be interpreted as a terminal performing data communication using IoT communication, and the terminal includes an IoT service server for communication therebetween or authentication, a memory for storing a program or protocol for communication with the gateway node, and a processor for calculating and controlling by executing the corresponding program, etc.

Thus, any terminal may be used as far as it may communicate with the IoT service server and gateway node for communication between the IoT device in the IoT service network and the terminal for controlling the IoT device or authentication thereof, and communication may be performed by being mounted with a communication application for IoT communication.

The method for providing a controlling service for IoT security according to an embodiment of the present invention based on the IoT service network system will be explained in more detail with reference to FIG. 2.

Figure 2:
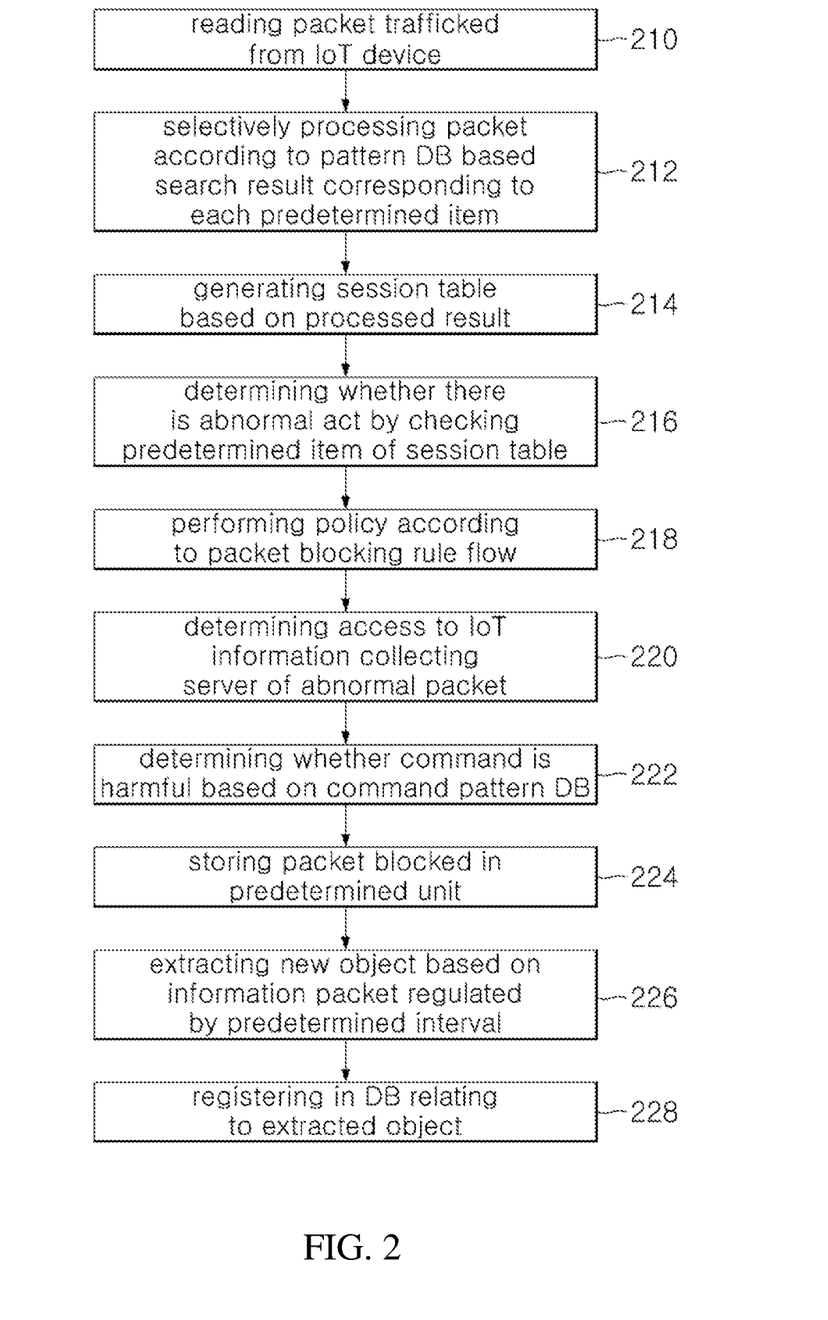
FIG. 2 is an overall flow chart illustrating a method for providing a controlling service for IoT security according to an embodiment of the present invention.

FIG. 2 is an overall flowchart illustrating a method for providing a controlling service for IoT security according to an embodiment of the present invention.

Referring to FIG. 2, in step 210, packets trafficked from a plurality of IoT devices are read. That is, packets trafficked from a plurality of IoT devices are read when exchanging data between a plurality of IoT devices and the IoT information collecting server.

In step 212, the corresponding packet is selectively processed through a predetermined policy according to the pattern DB based search result corresponding to each predetermined item of the packet read by the packet collecting part.

In this case, the predetermined item includes IoT device type pattern information included in the packet transmitted from the IoT device (e.g., sensor) and command type information that may be used for each IoT device.

Also, the predetermined policy is a policy defining the corresponding IoT device type by determining whether the corresponding IoT device type pattern information corresponds to the packet information corresponding to the read packet through IoT device type pattern DB search/comparison, and allowing the corresponding IoT device type pattern information to transmit a packet not searched from the IoT device type pattern DB to a predetermined unit (e.g., command learning part).

Also, it is a policy defining the corresponding command type by determining whether the command pattern information corresponds to the packet information corresponding to the read packet through command pattern DB search/comparison in which command type information corresponding to each IoT device is stored, or allowing the corresponding command pattern information to transmit a packet not searched from the command pattern DB to the command learning part.

As such, the IoT device type (e.g., type of sensor) and command type pattern information that can be used for each IoT device obtained through payload analysis of packet read through operation in step 212 of the present invention are searched respectively from the IoT device type information related DB and command pattern DB storing command type pattern information managed by the corresponding IoT service network, and it is determined whether they are identical. When it is determined that they are identical, the IoT device type and command pattern type are defined according to the determination result, or IoT device type and command pattern information not searched from the DB are sent to the command learning part and the packet is selectively processed according to whether they correspond to DB information. Command pattern DB information is continuously undated through the command learning part, and the IoT device type pattern DB on new additional devices collected from the command learning part is selectively updated by the operator.

Next, in step 214, a session table is generated based on the operation processing result in step 212.

Figure 4:
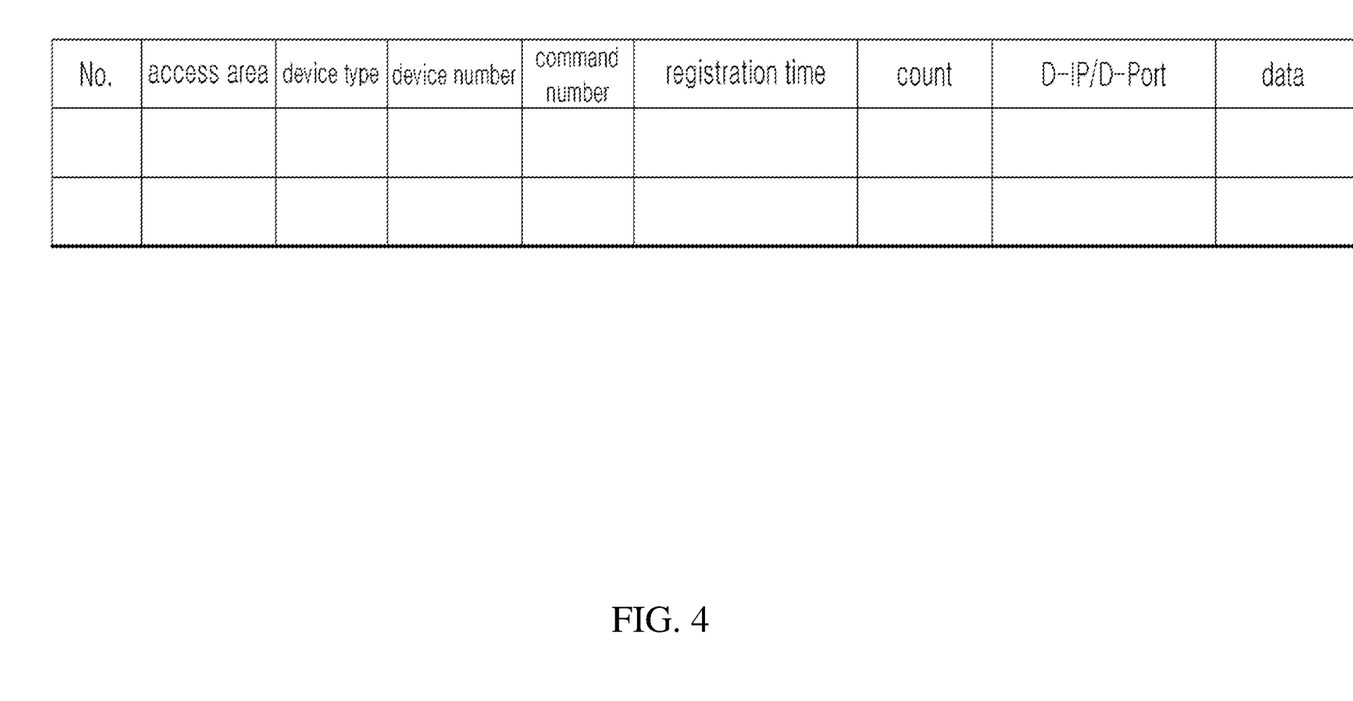
FIG. 4 is an exemplary diagram illustrating a session table based on an apparatus for providing an authentication service for IoT security according to an embodiment of the present invention.

The session table is managed in command unit for each IoT device accessing the IoT gateway relaying data between a plurality of IoT devices and an IoT server connected to the IoT devices to integrally manage them, and as illustrated in FIG. 4, the session table 410 includes corresponding information for each access area number, device type, device number, command transmitting point, count 412, 5 tuple, and transmission packet filter.

The 5 tuple is IP of IoT device, IP of service port and target server, and service port information.

In step 216, the preemptive blocking part determines whether there is an abnormal act by checking a predetermined item of the session table through the packet collecting part.

Here, the predetermined item means the count 412 of the session table, and information corresponding to the count 412 item is an average number of transmission for a predetermined time period (e.g., 1 minute in average) for the same command of the same device extracted from a packet payload and configured of items of the session table 410.

In step 218, a policy is performed according to the packet block rule management flow, and in step 220, access to the IoT server of abnormal packet is blocked.

Here, the packet block rule management flow detects whether there is a DoS attack occurring in the corresponding IoT device by using the count information output from the session table looked up when receiving a packet, and determines whether to block the corresponding packet according to the detection result.

In other words, the packet of DoS attack occurring in the corresponding IoT sensor is preemptively blocked by using count information of the session table generated in the packet collecting part through the preemptive blocking part to which the present invention is applied, and abnormal packet accessing the IoT information collecting server not allowed based on the access policy DB information for each IoT device (IoT sensor) type and command type is preemptively blocked.

In this case, the blocked packet is transmitted to the command learning part. Thus, when the transmitted packet is different based on the packet size and structure information defined in the command pattern DB for each command (e.g., when a new packet is made by adding a packet made by the hacker himself to the data part), it is determined to be abnormal and the packet is blocked. The blocked packet transmitted to the command learning part continuously updates command pattern DB information defining the frame structure of each command by the command learning part, and the IoT device type pattern DB is updated by registering target ip information allowing access for command collected at the command learning part.

In step 222, it is determined whether the command corresponding to the corresponding packet is harmful based on the command pattern DB based search result defining the commands allowed for each IoT device integrally managed at the network through the command controlling part.

More specifically, the command controlling part performing operation in step 222 controls (blocks/logs) when the command is a command whose transmission is not allowed based on command pattern DB information defining the command allowed for each IoT device (e.g., command reversely accessed by the hacker, partly lost command data), and when there is a harmful packet included in the payload, it is blocked, and when there is no harmful packet, it is transmitted to the IoT information collecting server.

Latest command information is collected for each IoT device through the command learning part, and the command pattern DB information is continuously updated by allowing the operator to determine the control policy (allowing/blocking/logging, etc.) for the collected command information.

Then, in step 224, the packet blocked by the predetermined policy through the command learning part is stored in a predetermined unit, and in step 226, new object is extracted based on information on the packet regulated at a predetermined interval in the stored packet and registered in the corresponding pattern DB through the operation in step 228.

In other words, the command learning part performing operation after step 224 stores the packet blocked in the packet collecting part and preemptive blocking part in a daily unit file, and extracts new equipment, new command (command pattern, size, frame shape, etc.) and access control list (target ip to be accessed) of the stored packet based on information on the packet with regularity/periodicity (e.g., when there is a large number of IoT devices of the same type generating the same command in time interval) in a daily interval, and automatically registers (register/change policy information by the operator as needed) command number and control policy (allowing/blocking/logging) of the extracted command in the command pattern DB. The command pattern DB may include automatically extracted information (device type pattern/command pattern/packet length/frame dimension/access control) and information automatically assigned or assigned by operator (IoT device type/command number/control policy/both directions).

In the above, a method for providing a controlling service for IoT security according to an embodiment of the present invention was explained.

Hereinafter, the apparatus for providing a controlling service for IoT security according to an embodiment of the present invention will be explained in detail with reference to FIG. 3 to FIG. 7.

Figure 3:
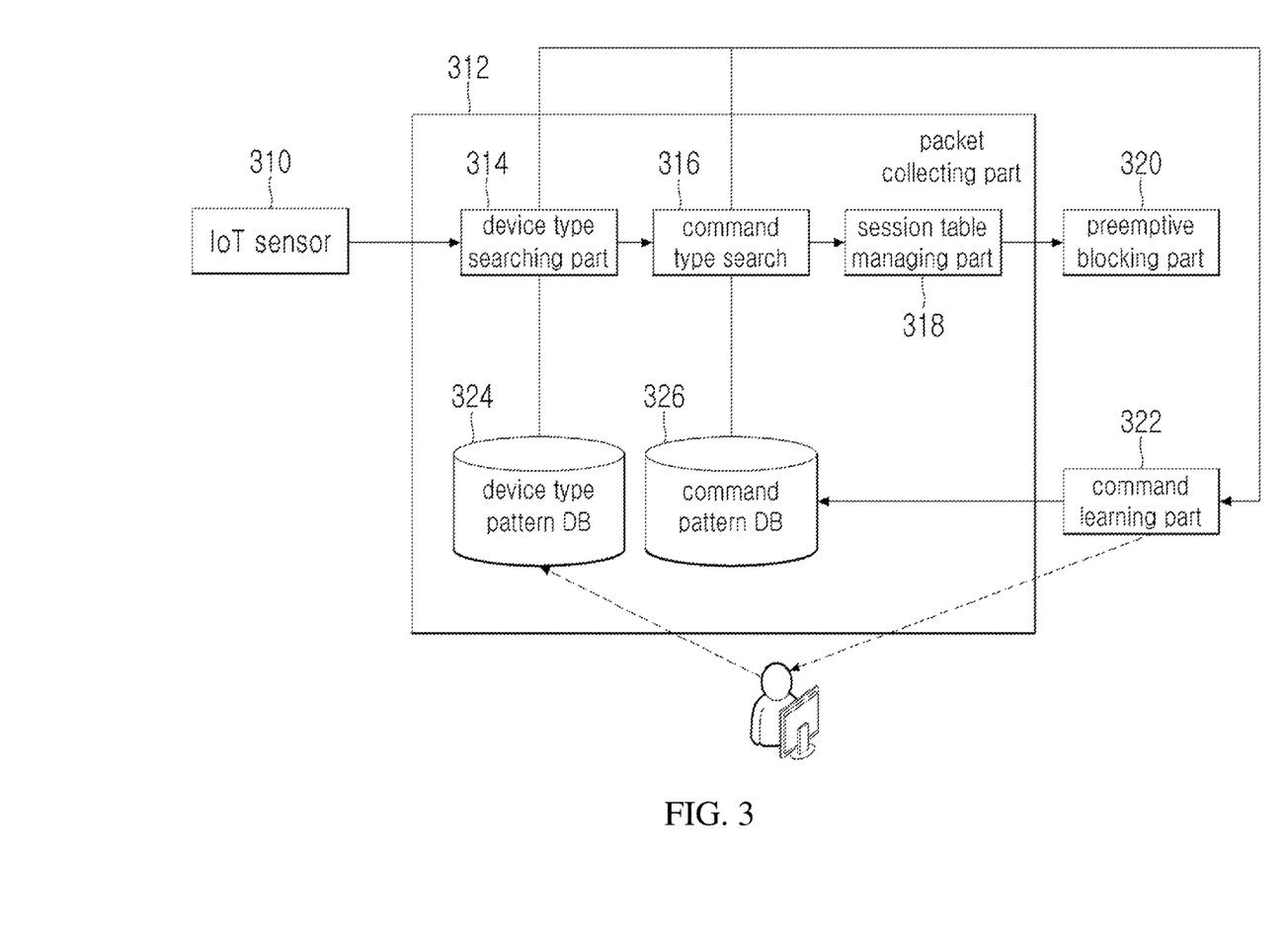
FIG. 3 is a detailed block diagram of a packet collecting part of an apparatus for providing an authentication service for IoT security according to an embodiment of the present invention.

First, FIG. 3 is a detailed block diagram of a packet collecting part of an apparatus for providing an authentication service for IoT security according to an embodiment of the present invention. Referring to FIG. 3, the packet collecting part 312 to which the present invention is applied includes a device type searching part 314, a command type searching part 316, and a session table managing part 318.

It reads a packet trafficked from a plurality of IoT devices 310 dispersed in a network supporting IoT service under the control of a controlling part (not shown) to collect data corresponding to the IoT service, selectively processes the corresponding packet according to the pattern DB based search result corresponding to each predetermined item of the read packet through a predetermined policy and generates a session table based on the processed result.

More specifically, the packet collecting part 312 includes a device type searching part 314 for defining the corresponding IoT device type by determining whether the corresponding IoT device type pattern information corresponds to the packet information corresponding to the read packet through IoT device type pattern DB 324 search/comparison, and allowing the corresponding IoT device type pattern information to transmit a packet not searched from the IoT device type pattern DB 324 to a predetermined unit (command learning part), a command type searching part 316 for defining the corresponding command type by determining whether the command pattern information corresponds to the packet information corresponding to the read packet through command pattern DB 326 search/comparison in which command type information corresponding to each IoT device is stored, and allowing the corresponding command pattern information to transmit a packet not searched from the command pattern DB to a predetermined unit, and a session table managing part 318 for generating a session table based on packet processing information processed through the device type searching part 314 and the command type searching part 316, and managing the session table generated in command unit for each IoT device accessing the generated session table.

Here, the session table includes corresponding information for each access area number, device type, device number, command transmitting point, count, 5 tuple, and transmission packet filter, the count information is an average number of transmission for a predetermined time period for the same command of the same device, and the 5 tuple includes IP of IoT device, IP of service port and target server, and service port information.

Meanwhile, the device type pattern DB and command pattern DB 326 illustrated in FIG. 3 are DB provided by an apparatus for providing a controlling service for IoT security based on command control IoT gateway to which the present invention is applied under the control of the controlling part, not a limited DB included in the packet collecting part 312. Also, the control part controls the overall operation of the apparatus for providing a controlling service for IoT security of the present invention including a packet collecting part 312, a preemptive blocking part 320, a command control part, command learning part 322, a device type pattern DB 324 and a command pattern DB 326.

That is, the controlling part controls the predetermined policy for each packet collecting part 312, preemptive blocking part 320, command controlling part and command learning part 322 in order, and transmits it to the pattern DB update and IoT information collecting server corresponding to each predetermined item predetermined from the network performing IoT service in association with the object obtained based on the control result.

Figure 5:
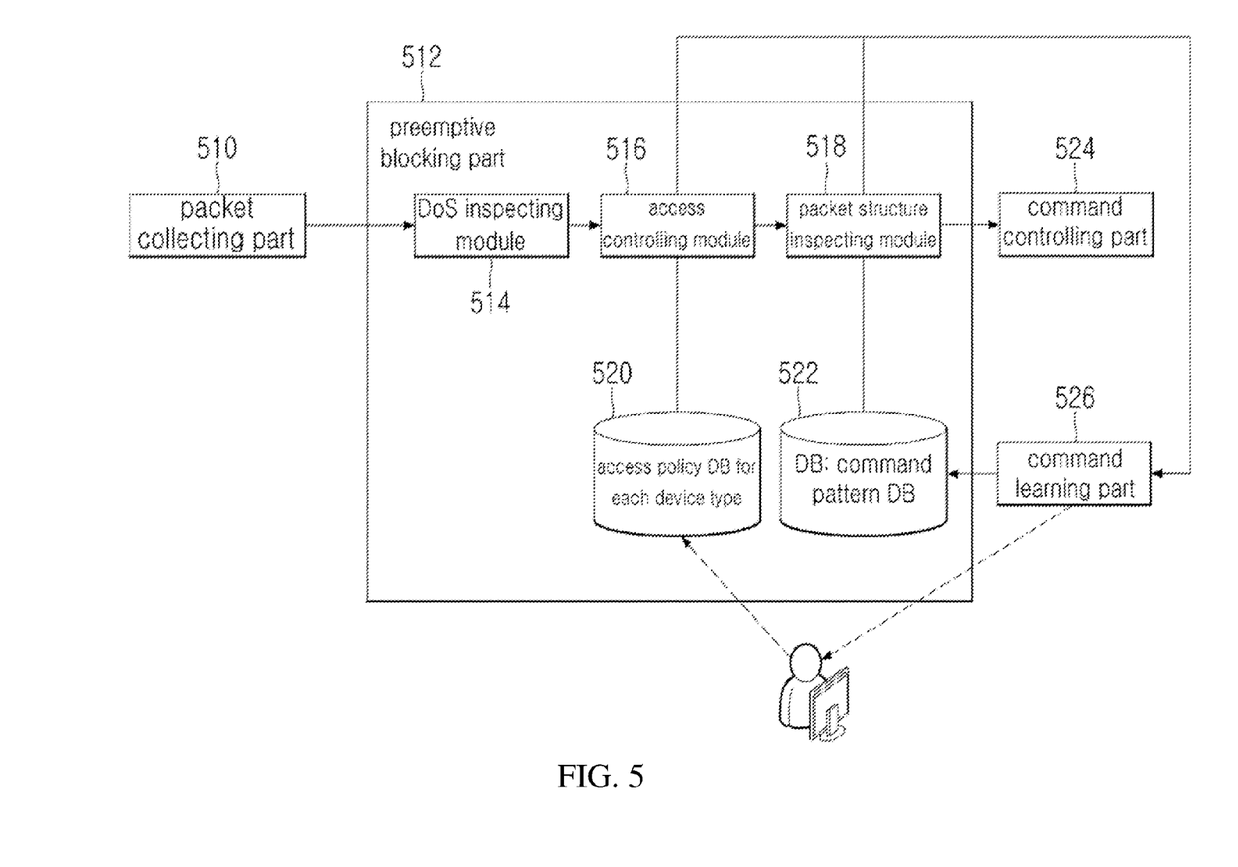
FIG. 5 is a detailed block diagram of a preemptive blocking part of an apparatus for providing a controlling service for IoT security according to an embodiment of the present invention.

Next, FIG. 5 is a detailed block diagram of a preemptive blocking part of an apparatus for providing a controlling service for IoT security according to an embodiment of the present invention. Referring to FIG. 5, the preemptive blocking part 312 to which the present invention is applied determines whether there is an abnormal act by checking a predetermined item of the session table generated in the packet collecting part 510 using a DoS inspecting module 514, an access controlling module 516, and a packet structure inspection 518 under the control of the controlling unit, and blocks access to IoT server of abnormal packet by performing a policy according to packet blocking rule management flow.

More specifically, the preemptive blocking part 512 of the present invention includes a DoS inspecting module 514 for preemptively blocking DoS attack packet generated in the corresponding IoT device (sensor) by using count information of the session table generated in the packet collecting part 510, an access control module 516 for preemptively blocking abnormal packet accessing the IoT server not allowed based on information of access policy DB 520 for each IoT sensor type and command type, and transmitting the blocked packet to the command learning part 526, and a packet structure inspecting module 518 for blocking the packet by determining the packet to be abnormal when the transmitted packet is different based on packet size and structure information defined in command pattern DB for each command, and transmitting the blocked packet to the command learning part 526.

The information on command pattern DB 522 defining the frame structure for each command through the command learning part 526 is updated continuously, and the IoT device type pattern DB is updated by registering target ip information allowing access for each command collected in the command learning part 526.

Figure 6:
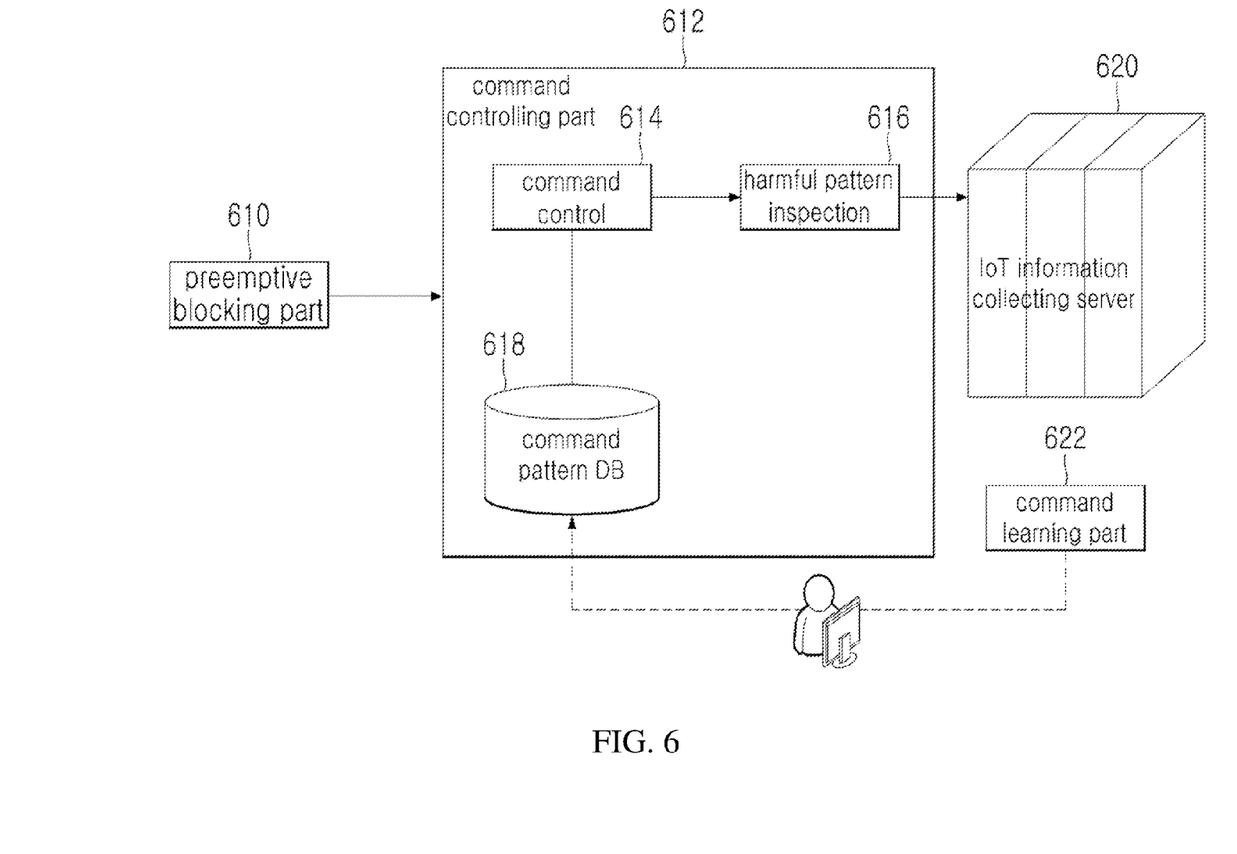
FIG. 6 is a detailed block diagram of a command controlling part of an apparatus for providing a controlling service for IoT security according to an embodiment of the present invention.

FIG. 6 is a detailed block diagram of a command controlling part of an apparatus for providing a controlling service for IoT security according to an embodiment of the present invention. Referring to FIG. 6, the command controlling part 612 to which the present invention is applied includes a command control 614 and a harmful pattern inspecting 616 module, and determines whether a command corresponding to the packet is harmful based on the command pattern DB 618 based search result defining the command allowed for each IoT device integrally managed at the network under the control of the controlling part.

More specifically, the command controlling part 612 includes a command controlling module 614 controlling (blocking/logging) when the command transmitted based on information on command pattern DB 618 defining the command allowed for each IoT sensor device is a command not allowed, and a harmful pattern inspecting module 616 blocking the packet when there is a harmful packet included in the payload, or transmitting the packet to the IoT information collecting server 620 when there is no harmful packet. Latest command information is collected for each IoT sensor through the command learning part 622, and the command pattern DB information is continuously updated by allowing the operator to determine the control policy (allowing/blocking/logging, etc.) for the collected command information.

Figure 7:
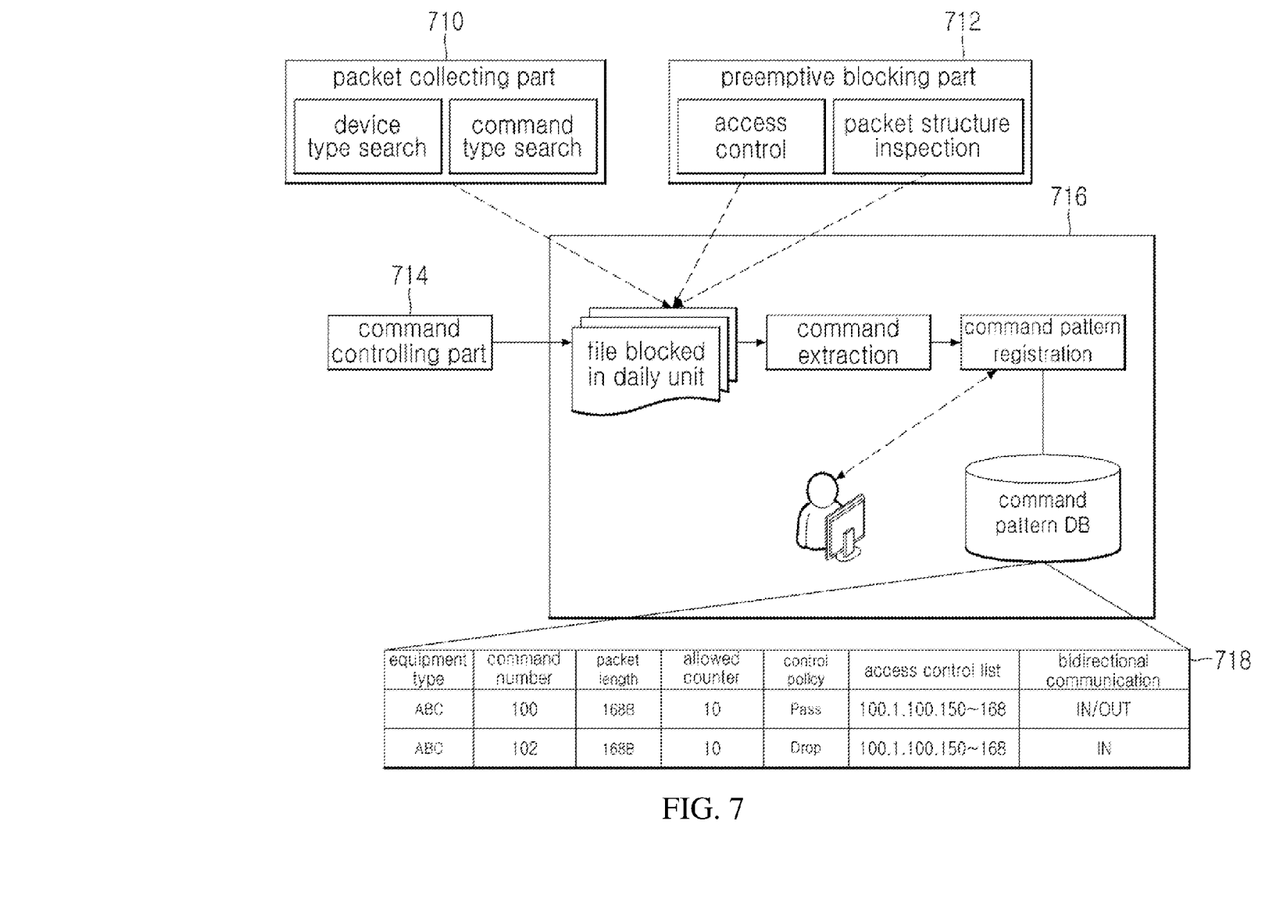
FIG. 7 is a detailed block diagram of a command learning part of an apparatus for providing a controlling service for IoT security according to an embodiment of the present invention.

FIG. 7 is a detailed block diagram of the command learning part 716 of an apparatus for providing a controlling service for IoT security according to an embodiment of the present invention. Referring to FIG. 7, the command controlling part 612 to which the present invention is applied stores a packet stored through the predetermined policy in a predetermined unit, and extracts new object based on information on the packet regulated at a predetermined interval in the stored packet and registers it in the corresponding pattern DB.

In this case, the information on the packet regulated by a predetermined interval is information on the packet with regularity and periodicity in a daily interval, and the new object includes new command and access control list determined based on new IoT device, command pattern, size, shape of frame, and the command number and control policy of the new command are registered in the command pattern DB.

As illustrated in FIG. 7, the command learning part 716 to which the present invention is applied stores the packet blocked in the packet collecting part 710 and preemptive blocking part 712 in a daily unit file, and includes a command extracting module extracting new equipment, new command (command pattern, size, frame shape, etc.) and access control list (target ip to be accessed) based on information on the packet with regularity/periodicity (e.g., when there is a large number of IoT devices of the same type generating the same command in time interval) in a daily interval, and a command pattern registering module automatically registering (registering/changing policy information by the operator as needed) command number and control policy (allowing/blocking/logging) of the extracted command in the command pattern DB. Information on the command pattern DB may include automatically extracted information such as the table of 718 (device type pattern/command pattern/packet length/frame dimension/access control) and information automatically assigned or assigned by operator (IoT device type/command number/control policy/both directions).

Operation relating to the method and apparatus for providing a controlling service for IoT security according to the present invention may be performed as described above. Meanwhile, the detailed description of the invention has been described with respect to specific embodiments, but various modifications may be made within the scope of the present invention. Thus, the scope of the present invention shall not be defined by the embodiments, but by the appended claims and equivalents thereto.

What is claimed is:

1. A method for providing a controlling service for Internet of Thing (IoT) security, comprising:
   reading a packet trafficked from a plurality of IoT devices dispersed in a network supporting IoT service to collect data corresponding to the IoT service;
   selectively processing the corresponding packet according to a pattern DB based search result corresponding to each predetermined item of the read packet through a predetermined policy, and generating a session table based on the processed result;
   determining whether there is an abnormal act by checking a predetermined item of the session table, and blocking access to IoT server of abnormal packet by performing a policy according to a packet blocking rule management flow;
   determining whether a command corresponding to the packet is harmful based on a command pattern DB based search result defining the command allowed for each IoT device integrally managed at the network; and
   storing the packet blocked through the predetermined policy per predetermined unit, extracting a new object based on information on the packet regulated by a predetermined interval in the stored packet, and registering it in a corresponding pattern DB, wherein the packet blocking rule management flow detects whether there is a DOS attack occurring in the corresponding IoT device by using the count information output from the session table looked up when receiving a packet, and determines whether to block the corresponding packet according to the detection result, blocks abnormal packet whose access to the IoT server is not allowed based on the corresponding access policy DB information for each IoT device and command type, and determines the packet as an abnormal packet when it does not match the comparison/analysis result of packet read based on packet pattern defined in command pattern DB for each command and blocks the corresponding packet.

2. The method of claim 1, wherein the predetermined policy defines the corresponding IoT device type by determining whether the corresponding IoT device type pattern information corresponds to the packet information corresponding to the read packet through JOT device type pattern DB search/comparison, or allows the corresponding JOT device type pattern information to transmit a packet not searched from the JOT device type pattern DB to a predetermined unit, and defines the corresponding command type by determining whether the command pattern information corresponds to the packet information corresponding to the read packet through command pattern DB search/comparison in which command type information corresponding to each JOT device is stored, or allows the corresponding command pattern information to transmit a packet not searched from the command pattern DB to a predetermined unit.

3. The method of claim 1, wherein the session table is managed in command unit for each IoT device accessing the IoT gateway relaying data between a plurality of JOT devices and an JOT server connected to the JOT devices to integrally manage them, and comprises corresponding information for each access area number, device type, device number, command transmitting point, count, 5 tuple, and transmission packet filter.

4. The method of claim 3, wherein the count information is an average number of transmission for a predetermined time period for the same command of the same device extracted from a packet payload and configured of items of the session table, and the 5 tuple includes JP of JoT device, JP of service port and target server, and service port information.

5. The method of claim 1, wherein the information on the packet regulated by a predetermined interval is information on the packet with regularity and periodicity in a daily interval.

6. The method of claim 1, wherein the new object includes new command and access control 11'st determined based on new IoT device, command pattern, size, shape of frame, and the command number and control policy of the new command are registered in the command pattern DB.

7. An apparatus for providing a controlling service for IoT security, comprising:
a packet collecting part for reading a packet trafficked from a plurality of IoT devices dispersed in a network supporting IoT service to collect data corresponding to the IoT service under the control of a controlling part, selectively processing the corresponding packet according to a pattern DB based search result corresponding to each predetermined item of the read packet through a predetermined policy, and generating a session table based on the processed result;
a preemptive blocking part for determining whether there is an abnormal act by checking a predetermined item of the session table generated by the packet collecting part, and blocking access to IoT server of abnormal packet by performing a policy according to packet blocking rule management flow;
a command controlling part for determining whether a command corresponding to the packet is harmful based on a command pattern DB based search result defining the command allowed for each IoT device integrally managed at the network; and
a command learning part for storing the packet blocked through the predetermined policy per predetermined unit, extracting a new object based on information on the packet regulated by a predetermined interval in the stored packet, and registering it in a corresponding pattern DB, wherein the preemptive blocking part detects whether there is a DOS attack occurring in the corresponding IoT device by using the count information output from the session table looked up when receiving a packet, and determines whether to block the corresponding packet according to the detection result, blocks abnormal packet whose access to the IoT server is not allowed based on the corresponding access policy DB information for each IoT device and command type, and determines the packet as an abnormal packet when it does not match the comparison/analysis result of packet read based on packet pattern defined in command pattern DB for each command and blocks the corresponding packet to perform the packet block rule management flow.

8. The apparatus of claim 7, wherein the packet collecting part comprises:
a device type searching part for defining the corresponding IoT device type by determining whether the corresponding IoT device type pattern information corresponds to the packet information corresponding to the read packet through IoT device type pattern DB search/comparison, and allowing the corresponding IoT device type pattern information to transmit a packet not searched from the IoT device type pattern DB to a predetermined unit; and
a command type searching part for defining the corresponding command type by determining whether the command pattern information corresponds to the packet information corresponding to the read packet through command pattern DB search/comparison in which command type information corresponding to each IoT device is stored, and allowing the corresponding command pattern information to transmit a packet not searched from the command pattern DB to a predetermined unit.

9. The apparatus of claim 8, wherein the packet collecting part further comprises a session table managing part for generating a session table based on packet processing information processed through the device type searching part and the command type searching part, and managing the session table generated in command unit for each IoT device accessing the generated session table.

10. The apparatus of claim 9, wherein the session table comprises corresponding information for each access area number, device type, device number, command transmitting point, count, 5 tuple, and transmission packet filter.

11. The apparatus of claim 10, wherein the count information is an average number of transmission for a predetermined time period for the same command of the same device, and the 5 tuple includes IP of IoT device, IP of service port and target server, and service port information.

12. The apparatus of claim 8, wherein the controlling part controls the predetermined policy for each packet collecting part, preemptive blocking part, command controlling part and command learning part in order, and transmits it to the pattern DB update and IoT information collecting server corresponding to each item predetermined (from the network) in association with the object obtained based on the control result.

13. The apparatus of claim 7, wherein the information on the packet regulated by a predetermined interval is information on the packet with regularity and periodicity in a daily interval.

14. The apparatus of claim 7, wherein the new object includes new command and access control list determined based on new IoT device, command pattern, size, shape of frame, and the command number and control policy of the new command are registered in the command pattern DB.

* * * * *